United States Patent
Fan et al.

(10) Patent No.: US 8,213,638 B2
(45) Date of Patent: Jul. 3, 2012

(54) EQUALIZER

(75) Inventors: Yanli Fan, Allen, TX (US); Mark W. Morgan, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1358 days.

(21) Appl. No.: 11/708,874

(22) Filed: Feb. 20, 2007

(65) Prior Publication Data

US 2008/0198913 A1 Aug. 21, 2008

(51) Int. Cl.
*H03H 7/30* (2006.01)

(52) U.S. Cl. ........ 381/103; 375/229; 375/230; 375/232; 333/28 R; 330/304

(58) Field of Classification Search ............ 381/98–109, 381/120–121; 375/229–233; 333/17.1–18, 333/28 R; 330/302–306
See application file for complete search history.

(56) References Cited

U.S. PATENT DOCUMENTS

| | | | | |
|---|---|---|---|---|
| 5,124,673 A * | 6/1992 | Hershberger | .................... | 333/18 |
| 5,832,097 A * | 11/1998 | Armstrong et al. | ........... | 381/321 |
| 6,486,735 B1 * | 11/2002 | Phanse et al. | ................. | 330/254 |
| 6,566,951 B1 * | 5/2003 | Merrigan et al. | ............. | 330/254 |
| 6,917,257 B2 * | 7/2005 | Gondi | ......................... | 333/28 R |
| 7,564,899 B2 * | 7/2009 | Kuijk et al. | ................... | 375/232 |
| 7,737,759 B2 * | 6/2010 | Gaeta et al. | ................... | 327/352 |
| 2006/0088089 A1 * | 4/2006 | Gondi et al. | ................. | 375/232 |
| 2007/0201546 A1 * | 8/2007 | Lee | .............. | 375/229 |

* cited by examiner

*Primary Examiner* — Vivian Chin
*Assistant Examiner* — Fatimat O Olaniran
(74) *Attorney, Agent, or Firm* — John J. Patti; Wade J. Brady, III; Frederick J. Telecky, Jr.

(57) ABSTRACT

Methods and apparatus to provide an equalizer for analog adaptive control are disclosed. An example equalizer described herein includes a high frequency amplifier to receive an input signal and to amplify a high frequency portion of the input signal, a low frequency amplifier to receive the input signal and to amplify a low frequency portion of the input signal, and a weight factor controller to control a gain of the high frequency amplifier and a gain of the low frequency amplifier.

14 Claims, 4 Drawing Sheets

EQUALIZER

FIELD OF THE DISCLOSURE

This disclosure relates generally to analog devices and, more particularly, to methods and apparatus to provide an equalizer.

BACKGROUND

As bit rates increase in broadband data systems, the adverse effects of a communication conduit (e.g., a copper cable) are increased. For example, skin effect and dielectric loss in copper cables results in jitter and attenuation of transmitted data at high frequencies. Such loss results in errors in receiving and decoding signals. These losses increase as cable lengths increase.

Equalizers can be used to compensate for communication conduit degradation. An equalizer may be used to boost a signal within a desired frequency range. For example, an equalizer may boost the energy of a high frequency range of a signal to compensate for high frequency attenuation due to a communication conduit. Typically, equalizers include a control signal that may be used to adjust the amount of compensation provided by the equalizer. The control signal may be provided by an adaptive controller, which adjusts the control signals based on an analysis of the signal output by the equalizer. Such an adaptive equalizer is particularly useful when the characteristics of the communication conduit are not predetermined.

An example prior art equalizer 100 is illustrated in FIGS. 1A and 1B. The example equalizer 100 includes a fast path stage 102, a slow path stage 104, and a mixer stage 106. The fast path stage 102 includes a peaked amplifier, which is used to provide a predefined gain to a high frequency portion of an input signal $V_{in}$. The slow path stage 104 includes a flat response amplifier, which provides a predefined gain to a low frequency portion of the input signal $V_{in}$. The output signals of the fast path stage 102 and the slow path stage 104 (i.e., $V_{fast}$ and $V_{slow}$, respectively) are coupled to the mixer stage 106, which mixes $V_{fast}$ and $V_{slow}$ based on a variable weighting of the signals set by a control signal $V_{control}$.

DETAILED DESCRIPTION

Example signal equalizers and processes are described herein. The example signal equalizers and processes may be used in broadband data communication systems to improve signal quality. In one example, a signal equalizer may be configured to receive a media signal and an adaptive control signal and to boost the media signal based on the adaptive control signal. For example, the signal equalizer may amplify or boost (e.g., apply a gain greater than 1 to) a high frequency portion of the media signal.

In contrast to prior art equalizers (e.g., FIG. 1), the example equalizers and processes described herein use a single stage to boost (e.g., amplify) and mix high frequency and low frequency portions of an input signal. In particular, a control signal adjusts the gain applied to the high frequency portion of the input signal and adjusts the weighting that the high frequency portion of the signal has relative to the low frequency portion of the signal when the signals are combined or mixed. As a result, the example equalizers described herein do not require a separate mixer stage. In addition, the example equalizers described herein do not require the use of voltage controlled resistors or varactors, which are common in prior art equalizers.

Figure 2:
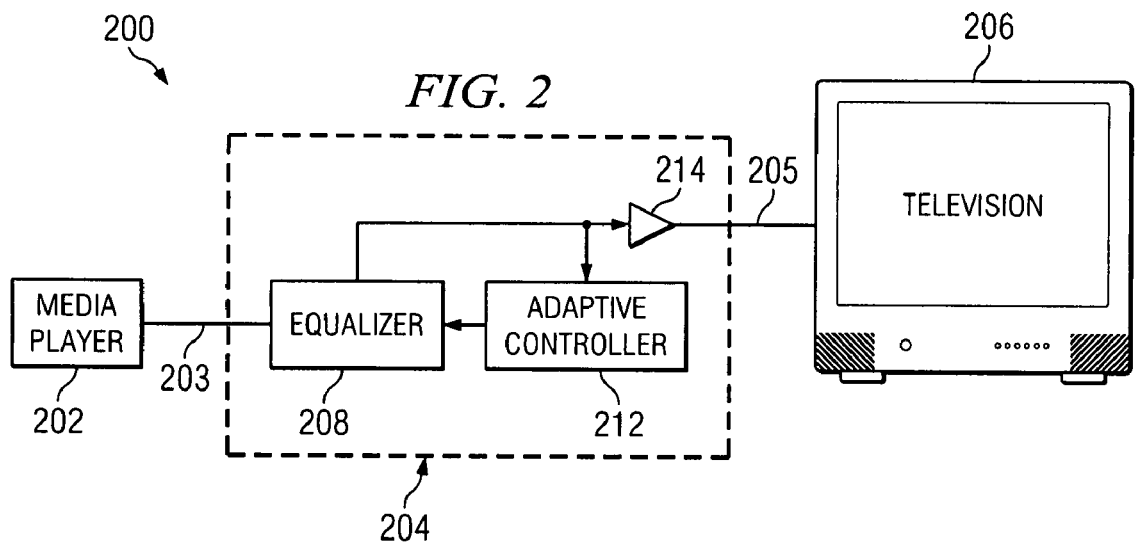
FIG. 2 is a block diagram of an example adaptive equalizer system.

Turning now to FIG. 2, an example system 200 includes a media player 202, an adaptive equalizer 204, and a television 206. In the example system 200, the media player 202 is communicatively coupled to the adaptive equalizer 204 via a cable 203, and the adaptive equalizer 204 is communicatively coupled to the television 206, via a cable 205. In the illustrated example, the cable 203 is much longer than the cable 205. In particular, in implementations where the adaptive equalizer 204 is integrated in the television 206 the difference between the length of the cable 203 and the length of the cable 205 is significant. Persons of ordinary skill in the art will recognize that the system 200 of FIG. 2 is an example implementation and the adaptive equalizer 204 may alternatively be used to equalize a signal between other devices. For example, the media player 202 may be any type of signal generator/transmitter and the television 206 may be any type of signal receiver.

The example media player 202 outputs a digital media signal having broadband characteristics. The example digital media signal includes audio information, video information, and control information. The media player 202 may be a digital versatile disc (DVD) player, a Blu-ray disc (BD) player, a high definition DVD (HD-DVD) player, a television set top box (STB), a digital video recorder (DVR), a personal video recorder (PVR), a home theatre personal computer (HTPC), a home theatre receiver, etc.

The television 206 of the illustrated example receives the digital media signal from the media player 202. In many known implementations, the television 206 receives the digital media signal directly from the media player 202. However, in the illustrated example, the television 206 receives the digital media signal after it has been equalized by the adaptive equalizer 204. The example television 206 decodes the digital media signal and presents audio and video information.

The adaptive equalizer 204 of the illustrated example receives the digital media signal from the media player 202 via the cable 203, equalizes the digital media signal, and outputs the equalized digital media signal to the television 206. The adaptive equalizer 204 may be a separate device (as illustrated in FIG. 2) or may be fully or partially integrated in the media player 202 and/or the television 206.

The adaptive equalizer 204 of the illustrated example includes an equalizer 208, an adaptive controller 212, and a buffer 214. The equalizer 208 of the illustrated example receives a digital media signal and equalizes the signal based on a control signal received from the adaptive controller 212. An example implementation of the equalizer 208 is described below in conjunction with FIGS. 3 and 4.

The adaptive controller 212 of the illustrated example receives the output signal of the equalizer 208, analyzes the output signal, and outputs a control signal to the equalizer 208 based on the analysis of the output signal. For example, the adaptive controller 212 may determine that a high frequency portion of the signal has been attenuated relative to a low frequency portion of the signal. To cause the equalizer 208 to compensate for the attenuation, the example adaptive controller 212 outputs a control signal to cause the equalizer to boost the high frequency portion of the signal. Accordingly, the adaptive controller 212 provides a feedback loop to the equalizer 208 to adaptively control the output of the equalizer 208. The adaptive controller 212 may be implemented using any type of controller such as, for example, a processor-based controller, an analog circuitry controller, etc.

The buffer 214 of the illustrated example receives the output of the equalizer 208 and transfers the output to the television 206. The buffer 214 isolates the impedance of the television 206 from the circuitry of the adaptive equalizer 204. The example buffer 214 is a unity gain buffer; however, any other type of buffer having any desired gain may be used.

Figure 3:
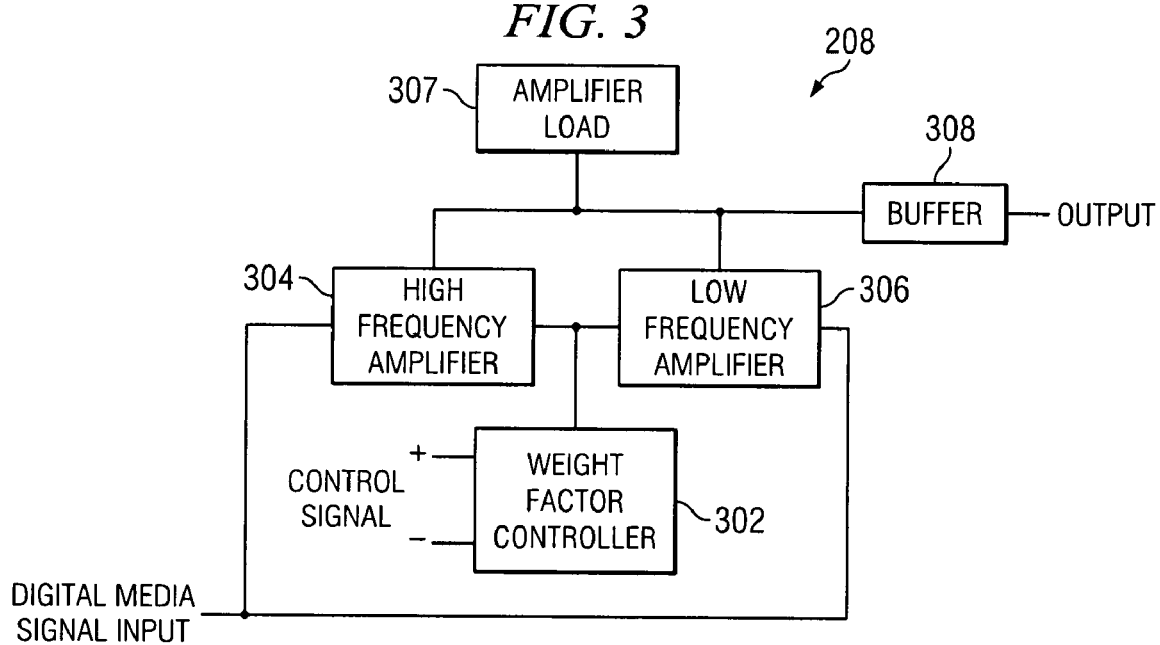
FIG. 3 is a block diagram of an example implementation of the equalizer of FIG. 2.

FIG. 3 is a block diagram of an example implementation of the equalizer 208 of FIG. 2. The example equalizer 208 receives a digital media signal input and a control signal input and outputs a modified digital media signal. The equalizer 208 of the illustrated example includes a weight factor controller 302, a high frequency amplifier 304, a low frequency amplifier 306, an amplifier load 307, and a buffer 308.

The weight factor controller 302 of the illustrated example receives a control signal (e.g., a control signal from the adaptive controller 212 of FIG. 2) and converts the control signal to a steering control signal (e.g., a differential signal). The steering control signal controls the gain of the high frequency amplifier 304 and the gain of the low frequency amplifier 306. In addition, the steering control signal controls the relative gains and, thus, the weighting that each of the high frequency amplifier 304 and the low frequency amplifier 306 use to mix their output signals. For example, providing a control signal wherein the potential between the non-inverting input and the inverting input is positive causes increased amplification in the high frequency amplifier 304 and the low frequency amplifier 306 and causes a greater weight (i.e., a relatively higher gain) to be applied to output of the high frequency amplifier 304 relative to the low frequency amplifier 306 as the signals are combined to produce the output signal of the equalizer 208. In the example implementation of FIG. 2, the length of the cable 203 connecting the media player 202 to the adaptive equalizer 204 affects the amount of high frequency attenuation imparted to a digital media signal transmitted via the cable 203. Accordingly, the control signal input to the weight factor controller 302 can be adjusted to compensate for such attenuation based on the length of the cable. In an example implementation, a more positive potential is applied between the inverting control signal and the non-inverting control signal when a longer cable is used to provide increased compensation for attenuation at high frequencies (e.g., boosting the high frequency components of the digital media signal).

The high frequency amplifier 304 of the illustrated example receives the steering control signal from the weight factor controller 302 and the digital media signal input and outputs an amplified version of the high frequency portion of the digital media signal input to the load 307 and the buffer 308 based on the steering control signal.

The low frequency amplifier 306 of the illustrated example receives the steering control signal from the weight factor controller 302 and the digital media signal input and outputs an amplified version of the low frequency portion of the digital media signal input to the load 307 and the buffer 308 based on the steering control signal.

The amplifier load 307 of the illustrated example provides a signal amplification load for the high frequency amplifier 304 and the low frequency amplifier 306. The amplifier load 307 of the illustrated example is connected to a power supply (not illustrated) that causes a current to flow through the amplifier load 307. The example amplifier load 307 is implemented by two impedances (e.g., resistors). However, the amplifier load 307 may alternatively be implemented using any number of impedances.

The buffer 308 of the illustrated example provides impedance isolation between the equalizer 208 and a load (or any other device) connected to the output of the equalizer 208. The buffer 308 may additionally provide amplification of the signal received from the high frequency amplifier 304 and the low frequency amplifier 306 depending on the specifications of a particular implementation.

Figure 4:
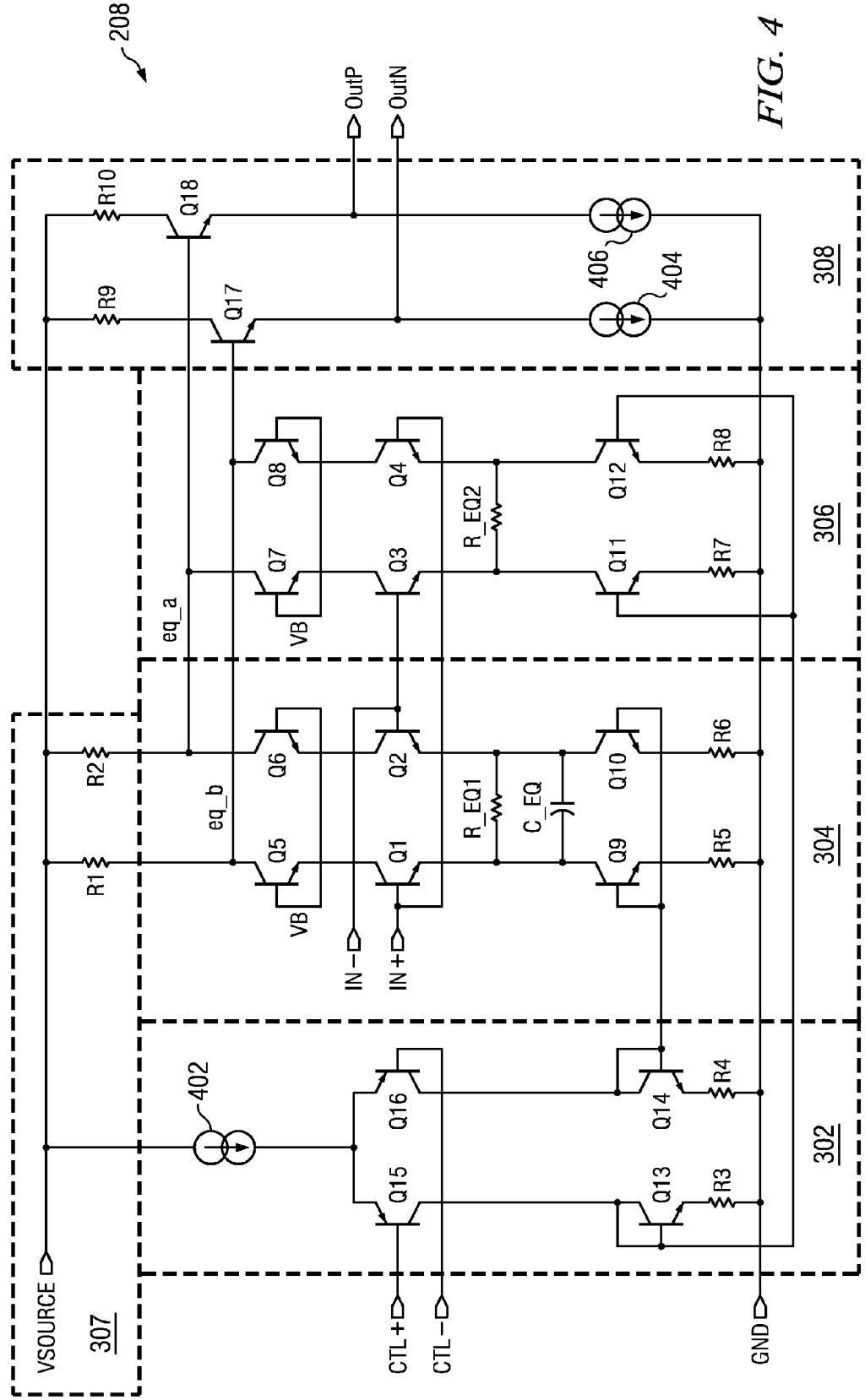
FIG. 4 is a schematic diagram of an example implementation of the equalizer of FIG. 3.

Turning to FIG. 4, a schematic diagram of an example implementation of the equalizer 208 can be seen. As shown, the weight factor controller 302 generally comprises current source 402, transistors Q13 to Q15, and resistors R3 and R4. The high frequency amplifier 304 generally comprises transistors Q1, Q2, Q5, Q6, Q9, and Q10, resistors R5, R6, and R_EQ1, and a capacitor C_EQ. The low frequency amplifier 306 generally comprises transistors Q3, Q4, Q7, Q8, Q11, and Q12, and resistors R7, R8, and R_EQ2. The amplifier load 307 also generally comprises resistors R2 and R1 and a power supply source VSOURCE. The buffer 308 generally comprises transistors Q17 and Q18, resistors R9 and R10, and current sources 404 and 406.

The example equalizer 208 includes the current source 402 connected between the power supply source VSOURCE (e.g., a voltage source of 3.3 volts) and an emitter of the transistor Q15 and an emitter of the transistor Q16 (which collectively comprise a differential input pair). The current source 402 provides a substantially constant current to the transistor Q15 and the transistor Q16.

Unless otherwise specified, all transistors of the example equalizer 208 are NPN bipolar junction transistors. However, persons of ordinary skill in the art will recognize that PNP bipolar junction transistors and/or metal oxide semiconductor field effect transistors (MOSFET) may alternatively be used.

The transistor Q15 and the transistor Q16 implement a differential amplifier supplying current to the transistor Q13 and the transistor Q14.

The transistor Q15 is a PNP bipolar junction transistor. A base of the transistor Q15 is connected to the non-inverting node, connection, or signal of a control signal input (e.g., a control signal CTL+ from the adaptive controller 212 of FIG. 2). A collector of the transistor Q15 is connected to a collector of the transistor Q13. When the voltage difference between the inverting and the non-inverting control signal inputs is substantially equal to zero, half of the current from the current source 402 will flow to the transistor Q13. As voltage potential of the non-inverting input of the control signal increases relative to the inverting input of the control signal, more current will flow to the transistor Q13 and less current will flow to the transistor Q14.

The transistor Q16 is a PNP bipolar junction transistor. A base of the transistor Q16 is connected to the non-inverting node, connection, or signal of the control signal input (i.e., signal CTL−). A collector of the transistor Q16 is connected to a collector of the transistor Q14. When the voltage difference between the inverting and the non-inverting control signal inputs is substantially equal to zero, half of the current from the current source 402 will flow to the transistor Q14. As voltage potential of the inverting input of the control signal increases relative to the non-inverting input of the control signal, more current will flow to the transistor Q14 and less current will flow to the transistor Q13.

The transistor Q13 is diode connected. A base of the transistor Q13 is connected to the collector of the transistor Q13, a base of the transistor Q11, and a base of the transistor Q12. An emitter of the transistor Q13 is connected to the resistor R3. The transistor Q13 implements a current minor in conjunction with the transistor Q11 and the transistor Q12.

The transistor Q14 is also diode connected. A base of the transistor Q14 is connected to the collector of the transistor Q14, a base of the transistor Q8, and a base of the transistor Q10. An emitter of the transistor Q14 is connected to the resistor R4. The transistor Q14 implements a current minor in conjunction with the transistor Q9 and the transistor Q10.

The resistor R3 is connected between the emitter of the transistor Q13 and a ground potential. The resistor R4 is connected between the emitter of the transistor Q14 and the ground potential. In the illustrated example, the resistor R3 and the resistor R4 are resistors. Persons of ordinary skill in the art will recognize that in alternate implementations the resistor R3 and/or the resistor R4 may be eliminated.

Turning to the transistor Q11, an emitter of the transistor Q11 is connected to the resistor R7. A collector of the transistor Q11 is connected to the resistor R_EQ2 and the transistor Q3. The transistor Q11 mirrors the current of the transistor Q13. In particular, the transistor Q13 sets a voltage drop between the base of the transistor Q11 and the emitter of the transistor Q11 to cause a collector current of the transistor Q11 to match a collector current of the transistor Q13. Accordingly, the transistor Q11 acts a current sink.

Turning to the transistor Q12, an emitter of the transistor Q12 is connected to the resistor R8. A collector of the transistor Q12 is connected to the resistor R_EQ2 and the transistor Q4. The transistor Q12 mirrors the current of the transistor Q13. In particular, the transistor Q13 sets a voltage drop between the base of the transistor Q12 and the emitter of the transistor Q12 to cause a collector current of the transistor Q12 to match a collector current of the transistor Q13. Accordingly, the transistor Q12 acts a current sink.

The resistor R7 is connected between the emitter of the transistor Q11 and the ground potential. The resistor R8 is connected between the emitter of the transistor Q12 and the ground potential. In the illustrated example, the resistor R7, the resistor R8, and the resistor R_EQ2 are resistors. Persons of ordinary skill in the art will recognize that in alternate implementations the resistor R7 and the resistor R8 may be eliminated. In addition, the resistor R_EQ2 may alternatively be implemented by any other type of resistor.

A base of the transistor Q3 receives the inverting signal of the digital media signal input. A collector of the transistor Q3 is connected to an emitter of the transistor Q7. The transistor Q3 acts as a gain control device for the low frequency amplification of the inverting signal of the digital media signal input.

A base of the transistor Q4 receives the non-inverting signal of the digital media signal input. A collector of the transistor Q4 is connected to the emitter of the transistor Q8. The transistor Q4 acts as a gain control device for the low frequency amplification of the non-inverting signal of the digital media signal input. The transistor Q3 and the transistor Q4 implement a differential amplifier.

The transistor Q7 and the transistor Q8 provide noise isolation, particularly at higher frequencies. These two transistors may optionally be removed in alternate implementations of the equalizer 208 where noise isolation is not desired. A base of the transistor Q7 is connected to a base of the transistor Q8 and a reference voltage VB. For example, the reference voltage VB may be slightly less than the power supply source VSOURCE. A collector of the transistor Q7 is connected to the resistor R2 and a base of the transistor Q18. A collector of the transistor Q8 is connected to the resistor R1 and a base of the transistor Q17.

Turning to the transistor Q9, an emitter of the transistor Q9 is connected to the resistor R5. A collector of the transistor Q9 is connected to the resistor R_EQ1, the capacitor C_EQ and the transistor Q1. The transistor Q9 mirrors the current of the transistor Q14. In particular, the transistor Q14 sets a voltage drop between the base of the transistor Q9 and the emitter of the transistor Q9 to cause a collector current of the transistor Q9 to match a collector current of the transistor Q14. Accordingly, the transistor Q9 acts as a current sink.

Turning to the transistor Q10, an emitter of the transistor Q10 is connected to the resistor R6. A collector of the transistor Q10 is connected to the resistor R_EQ1, the capacitor C_EQ, and the transistor Q2. The transistor Q10 minors the current of the transistor Q14. In particular, the transistor Q14 sets a voltage drop between the base of the transistor Q10 and the emitter of the transistor Q10 to cause a collector current of the transistor Q10 to match a collector current of the transistor Q14. Accordingly, the transistor Q10 acts as a current sink.

The resistor R5 is connected between the emitter of the transistor Q9 and the ground potential. The resistor R6 is connected between the emitter of the transistor Q10 and the ground potential. In the illustrated example, the resistor R5, the resistor R6, and the resistor R_EQ1 are resistors. Persons of ordinary skill in the art will recognize that in alternate implementations the resistor R5 and the resistor R6 may alternatively be eliminated. In addition, the resistor R_EQ1 may alternatively be implemented by any other type of resistor.

A base of the transistor Q1 is coupled with the non-inverting signal of the digital media signal input. A collector of the transistor Q1 is connected to an emitter of the transistor Q5. The transistor Q1 acts as a gain control device for the high frequency amplification of the non-inverting signal of the digital media signal input.

A base of the transistor Q2 is coupled with the inverting signal of the digital media signal input. A collector of the transistor Q2 is connected to the emitter of the transistor Q6. The transistor Q2 acts as a gain control device for the high frequency amplification of the inverting signal of the digital media signal input. The transistor Q1 and the transistor Q2 implement a differential amplifier.

The transistor Q5 and the transistor Q6 provide noise isolation, particularly at higher frequencies. These two transistors may optionally be removed from alternative implementations of the equalizer 208 where noise isolation is not desired. A base of the transistor Q5 is connected to a base of the transistor Q6 and the reference voltage VB. For example, the reference voltage VB may be slightly less than the power supply source VSOURCE. A collector of the transistor Q5 is connected to the resistor R1 and a base of the transistor Q17. A collector of the transistor Q6 is connected to the resistor R2 and a base of the transistor Q18.

The resistor R1 is connected between the power supply source VSOURCE and the collector of the transistor Q5, the collector of the transistor Q8, and the base of the transistor Q17. The resistor R2 is connected between the power supply source VSOURCE and the collector of the transistor Q6, the transistor Q7, and the base of the transistor Q18. In the illustrated example, the resistor R2 and the resistor R1 are resistors. Persons of ordinary skill in the art will recognize that in alternate implementations the resistor R2 and the resistor R1 may alternatively be implemented by any other type of resistors.

A collector of the transistor Q17 is connected to the resistor R9. An emitter of the transistor Q17 is connected to the current source 404. The transistor Q17 allows current to flow from the collector to the emitter based on a base current of the transistor Q17 (e.g., current from the low frequency amplification and the high frequency amplification). A current that flows from the emitter of the transistor Q17 creates an inverting node, connection, or signal of the output digital media signal.

A collector of the transistor Q18 is connected to the resistor R10. An emitter of the transistor Q18 is connected to the current source 406. The transistor Q18 allows current to flow from the collector to the emitter based on a base current of the transistor Q18 (e.g., current from the low frequency amplification and the high frequency amplification). A current that flows from the emitter of the transistor Q18 creates a non-inverting node, connection, or signal of the output digital media signal.

The resistor R9 is connected between the power supply source VSOURCE and the collector of the transistor Q17. The resistor R10 is connected between the power supply source VSOURCE and the collector of the transistor Q18. In the illustrated example, the resistor R10 and the resistor R9 are resistors. Persons of ordinary skill in the art will recognize that in alternate implementations the resistor R10 and the resistor R9 may alternatively be eliminated.

The current source 404 provides bias current to transistor Q17 and the current source 406 provides bias current to transistor Q18. The transistor Q17 and the current source 404 implement an emitter follower buffer stage. The transistor Q18 and the current source 406 implement an emitter follower buffer stage. While the example buffer is described as an emitter follower stage, any other type of buffer may be used.

Figure 1A:
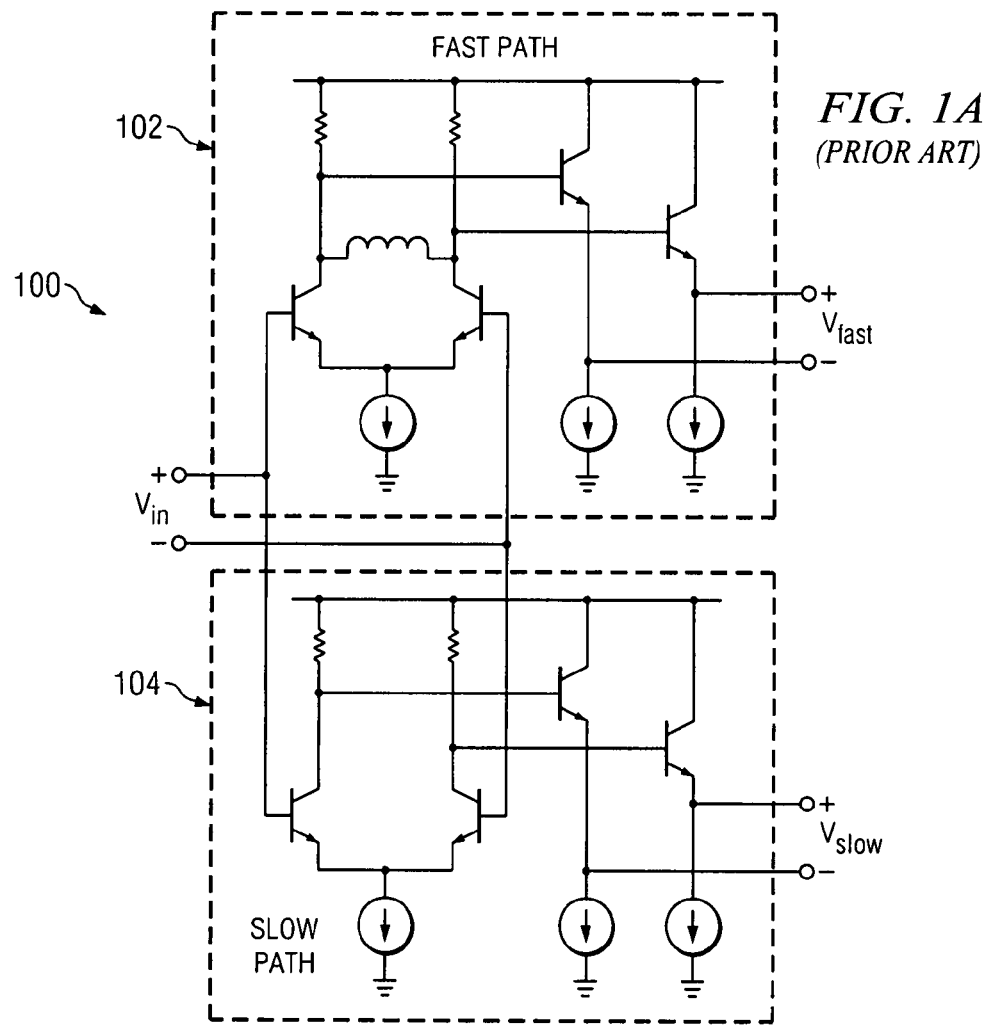
FIGS. 1A and 1B is a circuit diagram of an example prior art equalizer.
Figure 1B:
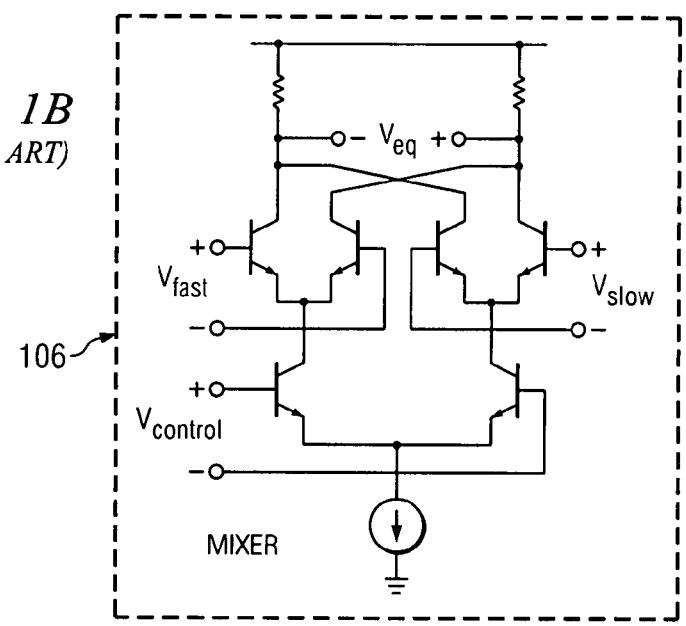
Figure 5:
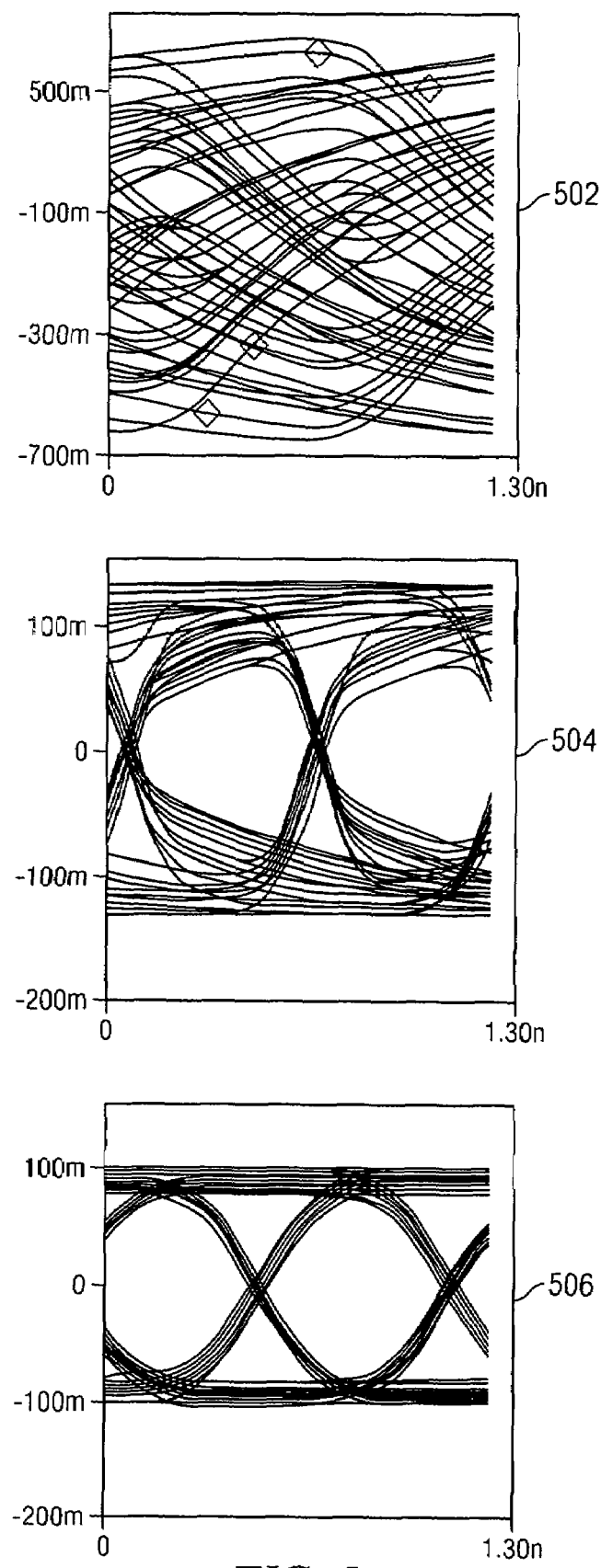
FIG. 5 is an illustration comparing an output signal of a prior art equalizer to an output of the adaptive equalizer of FIG. 2.

FIG. 5 is an illustration comparing an output signal of the prior art equalizer 100 of FIG. 1 and the output signal of the adaptive equalizer 204 of FIG. 2.

Block 502 illustrates an example "eye test" signal that has been attenuated (e.g., by being transmitted over cable 203 between the media player 202 and the adaptive equalizer 204) before any equalization has been applied. Block 504 illustrates the result of a prior art equalizer (e.g., the equalizer 100 of FIG. 1) applied to the attenuated eye test signal of block 502. Block 506 illustrates the result of the adaptive equalizer 204 of FIG. 2 applied to the attenuated "eye test" signal of block 502. As the figures show, the adaptive equalizer 204 reduces signal jitter to open the "eye" of the "eye test" signal. In other words, the adaptive equalizer 204 can more accurately compensate for the losses that result from transmitting the signal over a conductor.

From the foregoing, persons of ordinary skill in the art will appreciate that the above disclosed methods and apparatus may be realized within a single device or using two or more cooperating devices, and could be implemented by software, hardware, and/or firmware to implement the equalizer circuit disclosed herein. In addition, persons of ordinary skill in the art will recognize that the impedances and capacitances described herein may be selected based on the particular application in which the described apparatus is to be used.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
    a weight factor controller having:
        a first differential pair that generates a first current and a second current in response to a control signal;
        a first current mirror that is coupled to the differential pair so as to receive the first current; and
        a second current minor that is coupled to the differential pair so as to receive the second current;
    a high frequency amplifier having:
        a second differential pair that receives a differential input signal and that is coupled to the first current mirror; and
        a resistor-capacitor (RC) network that is coupled to the second differential pair and the first current minor;
    a low frequency amplifier having:
        a third differential pair that receives the differential input signal and that is coupled to the second current mirror; and
        a resistor that is coupled to the third differential pair and the second current minor; and
    a buffer that is coupled to the high frequency amplifier and the low frequency amplifier.

2. The apparatus of claim 1, wherein the apparatus further comprises an amplifier load that is coupled to the high and low frequency amplifiers.

3. The apparatus of claim 1, wherein the weight factor controller further comprises a current source that is coupled to the first differential pair, and wherein the first current minor further comprises a first diode-connected transistor that is couple to the differential pair so as to receive the first current, and wherein the second current mirror further comprise a second diode-connected transistor that is coupled to the differential pair so as to receive the second current.

4. The apparatus of claim 3, wherein the second differential pair further comprises:
    a first transistor having a first passive electrode, a second passive electrode, and a control electrode, wherein the first transistor receives a first portion of the differential input signal at its control electrode; and
    a second transistor having a first passive electrode, a second passive electrode, and a control electrode, wherein the second transistor receives a second portion of the differential input signal at its control electrode;
and wherein the first current minor further comprises:
    a third transistor having a first passive electrode, a second passive electrode, and a control electrode, wherein the control electrode of the third transistor is coupled to the first diode-connected transistor, and wherein the first passive electrode of the third transistor is coupled to the second passive electrode of the first transistor; and
    a fourth transistor having a first passive electrode, a second passive electrode, and a control electrode, wherein the control electrode of the fourth transistor is coupled to the first diode-connected transistor, and wherein the first passive electrode of the fourth transistor is coupled to the second passive electrode of the second transistor.

5. The apparatus of claim 4, wherein the third differential pair further comprises:
    a fifth transistor having a first passive electrode, a second passive electrode, and a control electrode, wherein the fifth transistor receives the first portion of the differential input signal at its control electrode; and
    a sixth transistor having a first passive electrode, a second passive electrode, and a control electrode, wherein the sixth transistor receives a second portion of the differential input signal at its control electrode;

and wherein the second current minor further comprises:

a seventh transistor having a first passive electrode, a second passive electrode, and a control electrode, wherein the control electrode of the seventh transistor is coupled to the second diode-connected transistor, and wherein the first passive electrode of the seventh transistor is coupled to the second passive electrode of the fifth transistor; and a eighth transistor having a first passive electrode, a second passive electrode, and a control electrode, wherein the control electrode of the eighth transistor is coupled to the second diode-connected transistor, and wherein the first passive electrode of the eighth transistor is coupled to the second passive electrode of the sixth transistor.

6. The apparatus of claim 5, wherein the first, second, third, fourth, fifth, sixth, seventh, and eighth transistors further comprise bipolar transistors.

7. The apparatus of claim 6, wherein the first, second, third, fourth, fifth, sixth, seventh, and eighth transistors further comprise NPN transistors.

8. An apparatus comprising:
an adaptive controller that generates a control signal; and
an equalizer having:
a weight factor controller having:
a first differential pair that is coupled to the adaptive controller so as to receives the control signal and that generates a first current and a second current in response to the control signal;
a first current mirror that is coupled to the differential pair so as to receive the first current; and
a second current mirror that is coupled to the differential pair so as to receive the second current;
a high frequency amplifier having:
a second differential pair that receives a differential input signal and that is coupled to the first current mirror; and
an RC network that is coupled to the second differential pair and the first current mirror;
a low frequency amplifier having:
a third differential pair that receives the differential input signal and that is coupled to the second current mirror; and
a resistor that is coupled to the third differential pair and the second current mirror; and
a buffer that is coupled to the high frequency amplifier and the low frequency amplifier.

9. The apparatus of claim 8, wherein the equalizer further comprises an amplifier load that is coupled to the high and low frequency amplifiers.

10. The apparatus of claim 9, wherein the weight factor controller further comprises a current source that is coupled to the first differential pair, and wherein the first current minor further comprises a first diode-connected transistor that is couple to the differential pair so as to receive the first current, and wherein the second current mirror further comprise a second diode-connected transistor that is coupled to the differential pair so as to receive the second current.

11. The apparatus of claim 10, wherein the second differential pair further comprises:
a first transistor having a first passive electrode, a second passive electrode, and a control electrode, wherein the first transistor receives a first portion of the differential input signal at its control electrode; and
a second transistor having a first passive electrode, a second passive electrode, and a control electrode, wherein the second transistor receives a second portion of the differential input signal at its control electrode;

and wherein the first current minor further comprises:

a third transistor having a first passive electrode, a second passive electrode, and a control electrode, wherein the control electrode of the third transistor is coupled to the first diode-connected transistor, and wherein the first passive electrode of the third transistor is coupled to the second passive electrode of the first transistor; and a fourth transistor having a first passive electrode, a second passive electrode, and a control electrode, wherein the control electrode of the fourth transistor is coupled to the first diode-connected transistor, and wherein the first passive electrode of the fourth transistor is coupled to the second passive electrode of the second transistor.

12. The apparatus of claim 11, wherein the third differential pair further comprises:
a fifth transistor having a first passive electrode, a second passive electrode, and a control electrode, wherein the fifth transistor receives the first portion of the differential input signal at its control electrode; and
a sixth transistor having a first passive electrode, a second passive electrode, and a control electrode, wherein the sixth transistor receives a second portion of the differential input signal at its control electrode;

and wherein the second current minor further comprises:

a seventh transistor having a first passive electrode, a second passive electrode, and a control electrode, wherein the control electrode of the seventh transistor is coupled to the second diode-connected transistor, and wherein the first passive electrode of the seventh transistor is coupled to the second passive electrode of the fifth transistor; and a eighth transistor having a first passive electrode, a second passive electrode, and a control electrode, wherein the control electrode of the eighth transistor is coupled to the second diode-connected transistor, and wherein the first passive electrode of the eighth transistor is coupled to the second passive electrode of the sixth transistor.

13. The apparatus of claim 12, wherein the first, second, third, fourth, fifth, sixth, seventh, and eighth transistors further comprise bipolar transistors.

14. The apparatus of claim 13, wherein the first, second, third, fourth, fifth, sixth, seventh, and eighth transistors further comprise NPN transistors.

* * * * *